United States Patent [19]

Boyd

[11] Patent Number: 4,984,882

[45] Date of Patent: Jan. 15, 1991

[54] SCANNER MIRROR CLIP ASSEMBLY

[75] Inventor: David W. Boyd, Greeley, Colo.

[73] Assignee: Hewlett-Packard Company, Palo Alto, Calif.

[21] Appl. No.: 345,384

[22] Filed: May 1, 1989

[51] Int. Cl.$^5$ .......................... G02B 7/18; A47G 1/24
[52] U.S. Cl. .................................... 350/632; 350/631; 248/468; 248/213.2; 248/316.7; 24/543
[58] Field of Search .................. 350/632, 631, 6.7, 6.8; 248/468, 476, 316.7, 213.2; 24/543, 30.5 P

[56] References Cited

U.S. PATENT DOCUMENTS

| | | | |
|---|---|---|---|
| 3,082,665 | 3/1963 | Jackson | 248/468 |
| 3,216,685 | 11/1965 | Raymond | 248/316.7 |
| 3,994,050 | 11/1976 | Bub | 248/468 |
| 4,397,438 | 8/1983 | Chapman | 248/316.7 |

FOREIGN PATENT DOCUMENTS 3300994 8/1984 Fed. Rep. of Germany ...... 248/468

Primary Examiner—Jon W. Henry

[57] ABSTRACT

A clip assembly for attaching an optical scanner mirror to an associated mounting structure including a U-shaped clip body for resiliently, snappingly engaging the mounting structure for holding the clip assembly in stationary relationship with the mounting structure, and a compliant member integrally formed with the clip body for urging the mirror against the mounting structure such that the mirror is resiliently held in stationary relationship therewith.

12 Claims, 5 Drawing Sheets

SCANNER MIRROR CLIP ASSEMBLY

BACKGROUND OF THE INVENTION

The present invention relates generally to optical scanners and, more particularly, to a clip assembly for attaching an optical scanner mirror to an associated support structure.

Optical scanners generally contain a number of mirrors which are mounted on supporting structure within the scanner. The mirrors are positioned in a preset relationship which provides a light path of predetermined length between a scanned object and the light processing electronics of the scanner. Such mirrors are typically held in position by clip assemblies provided at the ends of each mirror which hold the mirrors firmly in place.

One prior art scanner mirror clip assembly is illustrated in FIG. 1. A scanner mirror 1 is supported on a support block 2. The support block has planar surface portions 3 and 4 which engage abutting planar surface portions of the scanner mirror 1. A clip assembly 5 urges the scanner mirror against the support block. The clip assembly includes an L-shaped metal clip member 6 which is mounted on the support block by a screw 7. A rubber grommet 8 is mounted on the clip member. The grommet contacts the mirror 1, urging it against the support block 2.

OBJECTS OF THE INVENTION

It is an object of the present invention to provide a unitary, integrally formed clip assembly for attaching an elongate optical scanner mirror to an associated support structure.

It is another object of the present invention to provide a clip assembly and mounting bracket which are connectable through a snap-fit relationship so as to obviate the need for secondary attachment components such as pins, screws, and the like.

It is another object of the present invention to provide a clip assembly which enables quick and easy mirror installation and/or replacement.

It is another object of the present invention to provide a clip assembly which is relatively inexpensive to produce.

It is another object of the present invention to provide a clip assembly which normally holds a mirror in stable, stationary relationship with a mounting structure but which enables resilient displacement of the mirror relative the mounting structure so as to absorb shocks.

It is another object of the present invention to provide a clip assembly which normally holds a mirror in stable, stationary relationship with a mounting structure but which allows controlled displacement of the mirror relative the mounting structure to enable adjustment of the angular position of the mirror.

It is another object of the present invention to provide a clip assembly which holds a mirror assembly in stable, stationary relationship with a mounting structure and which accommodates small dimensional variations in the scanner mirror or scanner mirror mounting structure.

SUMMARY OF THE INVENTION

The present invention is directed to a clip assembly for attaching an elongate optical scanner mirror to an associated support structure. The clip assembly includes a U-shaped clip body which is adapted to engage the support structure in a snap-fit relationship for holding the clip assembly in stationary relationship with the support structure. A compliant member, which is integrally formed with the U-shaped clip body, is adapted to engage the mirror to urge it against the support structure. Thus, the mirror is resiliently held in stationary relationship with the support structure by the clip assembly.

In one embodiment of the invention, an adjustable displacement assembly is provided which coacts with the mirror, the support structure, and the clip assembly to adjust the angular position of the mirror.

The clip assembly is installed, without tools, by urging terminal ends of the clip body against a mounting bracket portion of the support structure until it snaps into locking engagement with the bracket. The clip assembly is removed, without tools, by spreading apart the terminal ends of the clip body and withdrawing the clip assembly from the mounting bracket.

BRIEF DESCRIPTION OF THE DRAWING

An illustrative and presently preferred embodiment of the invention is shown in the accompanying drawings in which.

DETAILED DESCRIPTION OF THE INVENTION

Figure 1:
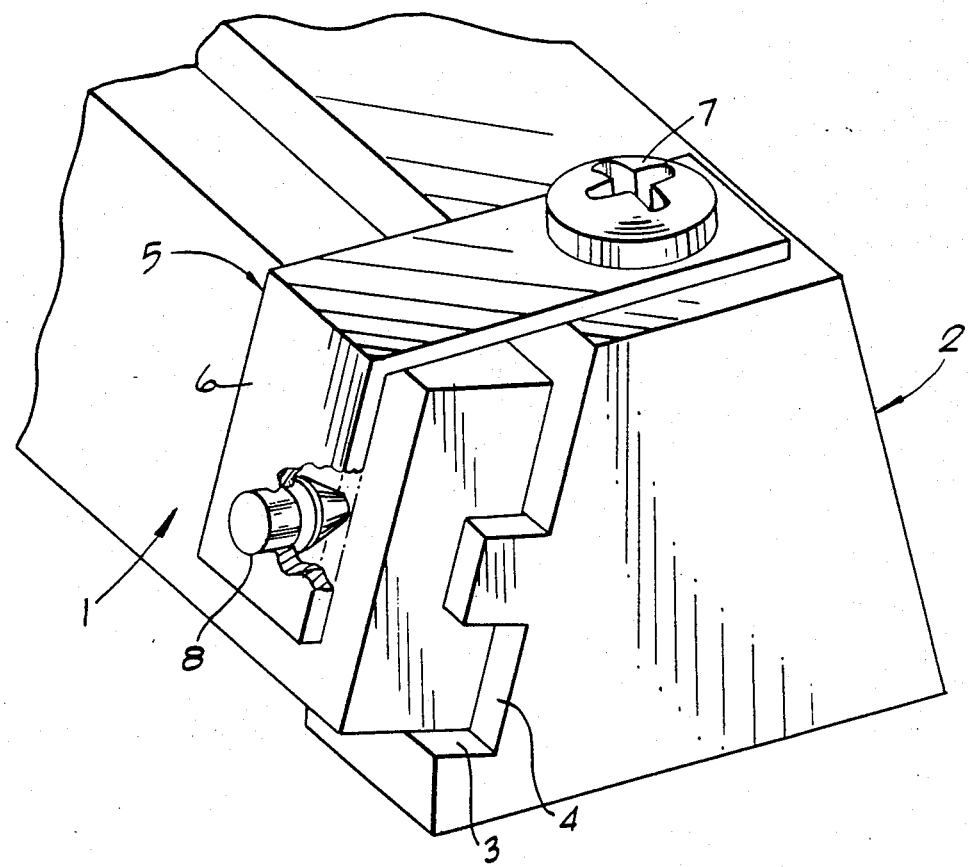
FIG. 1 is a perspective view of a prior art scanner mirror mounting assembly.

FIGS. 2–9 illustrate a clip assembly 10 for attaching an elongate optical scanner mirror 50 to a support structure 72. The clip assembly, in general, comprises a U-shaped clip body 12 which is adapted for resiliently, snappingly engaging the fixed support structure 72 for holding the clip assembly 10 in stationary relationship with the support structure; and a compliant member 14 integrally formed with the clip body 12 for urging the elongate mirror 50 against the support structure 72 whereby the mirror 50 is resiliently held in stationary relationship with respect to the support structure 72.

The compliant member 14 has a first end 16 which is integrally formed with the U-shaped body 12 and a second end 18 having a rounded, forwardly projecting surface 20 which is adapted to engage the scanner mirror 50.

The U-shaped clip body 12 may comprise an upper arm member 22 and a lower arm member 24. Both arm members are integrally formed with and project perpendicularly and forwardly from opposite ends of a transverse member 26. Each of the arm members has an inwardly extending, claw-like projection 28, 30 located at the distal end thereof. Each projection 28, 30 has a rearwardly and inwardly extending surface 34. The surface 34 on each member is adapted to cause the associated projection 28, 30 to be outwardly deflected during installation of the clip assembly on an associated support structure 72. The U-shaped body 12 is constructed of a highly-elastic, resilient substance, such as for example 20% glass-filled polycarbonate having a modulus of elasticity of between 700,000 psi and 1,000,000 psi, which enables the arm members 22, 24 to be deflected outwardly as illustrated in FIG. 4 and to thereafter return to a substantially parallel relationship as illustrated in FIG. 3.

Figure 2:
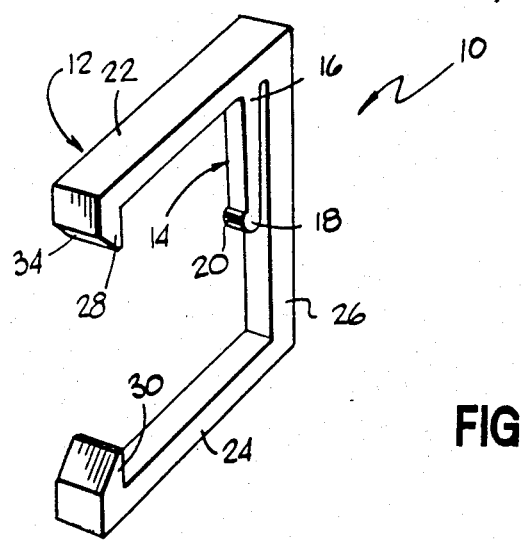
FIG. 2 is a perspective view of a scanner mirror clip assembly.
Figure 3:
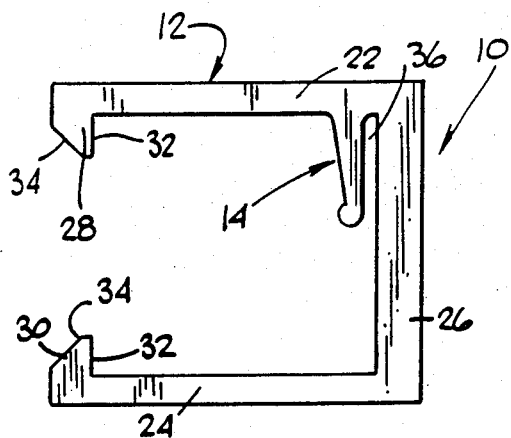
FIG. 3 is a side elevation view of a scanner mirror clip assembly in an unstressed state.
Figure 4:
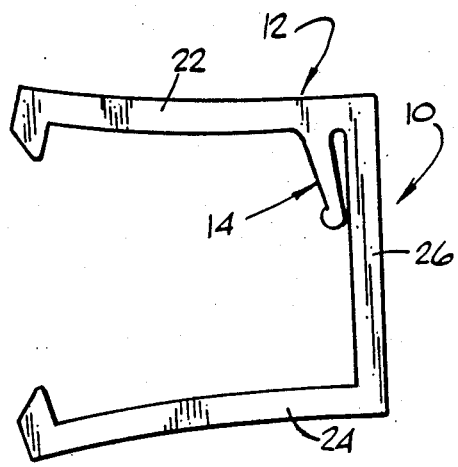
FIG. 4 is a side elevation view of a scanner mirror clip assembly showing clip arm members and a compliant mirror engaging member in resiliently deflected states.

In one preferred embodiment of the invention, as illustrated in FIGS. 2-4, the compliant member 14 extends from an interior surface of the upper arm member 22. A sufficient space 36 is provided between the compliant member 14 and the transverse member 26 to enable a small rearward deflection of the compliant member 14 during mirror engagement. This resilient rearward deflection of the compliant member is best illustrated in FIG. 4. In a typical embodiment of the clip assembly 12, the length of the clip body 12, measured parallel to the arm members, may be, e.g., 24.1 mm; the height of the clip body, measured parallel to the transverse member, may be, e.g., 20.5 mm; the length of the compliant member 14 may be e.g., 7.0 mm; and the width of gap 36 may be, e.g., 0.9 mm.

Figure 5:
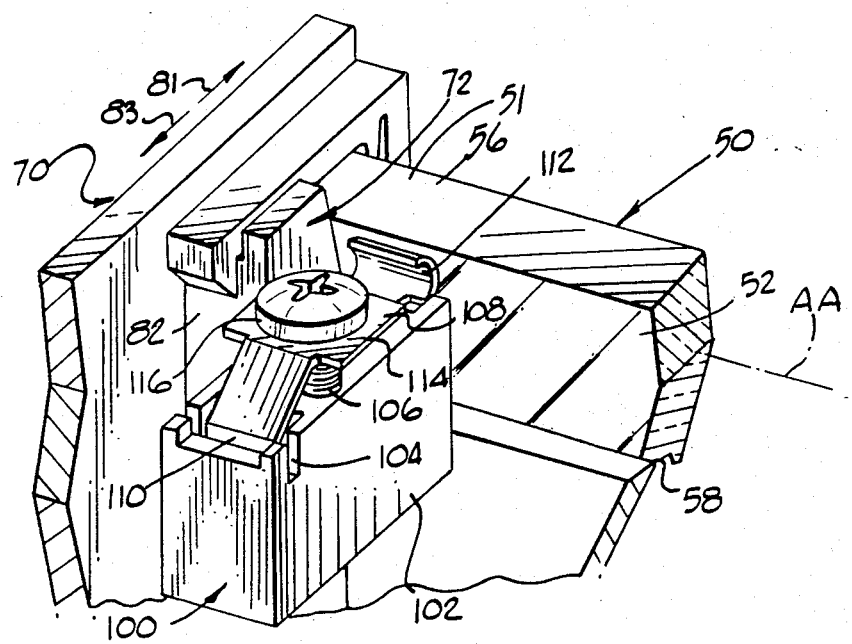
FIG. 5 is a perspective view illustrating the attachment of a scanner mirror to a mounting structure with a scanner mirror clip assembly and also illustrating a scanner mirror adjustment assembly.
Figure 6:
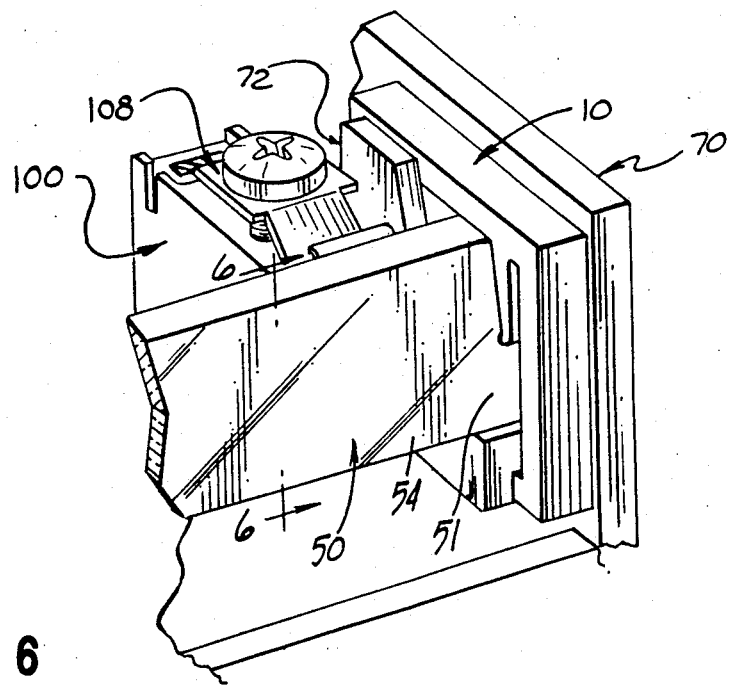
FIG. 6 is an illustration of the mirror, clip assembly, mounting structure, and adjustment assembly of FIG. 5 from another perspective.
Figure 8:
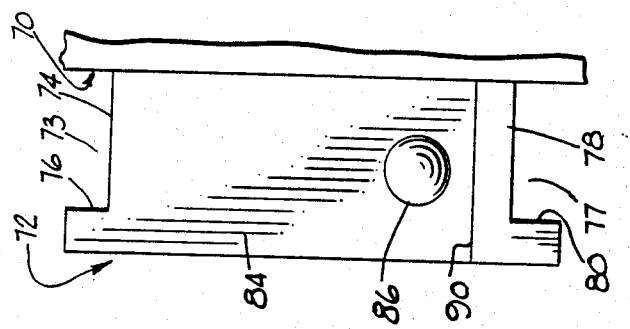
FIG. 8 is a detail rear elevation view of the mirror mounting structure shown in FIGS. 5–7.
Figure 7:
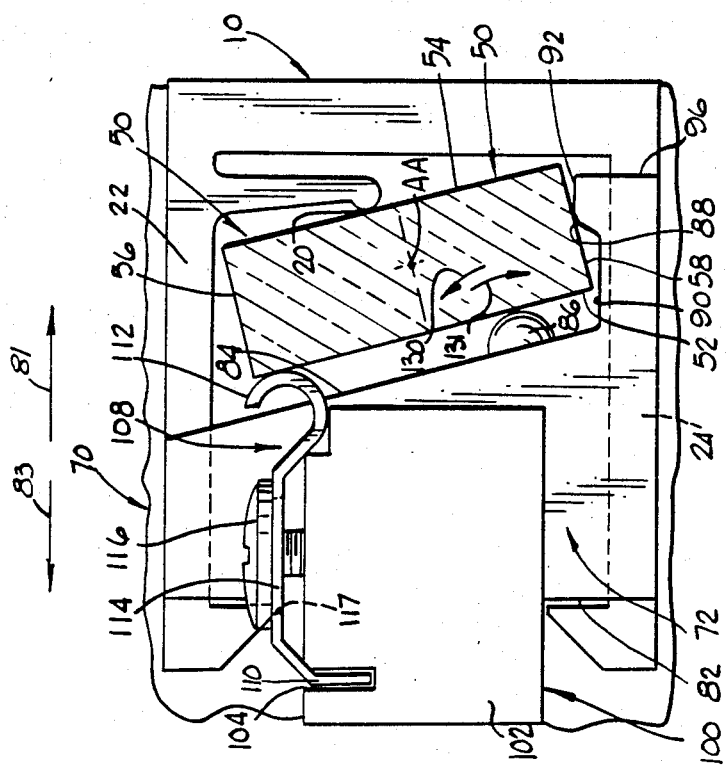
FIG. 7 is a partially cross-sectional elevation view of FIG. 5.
Figure 9:
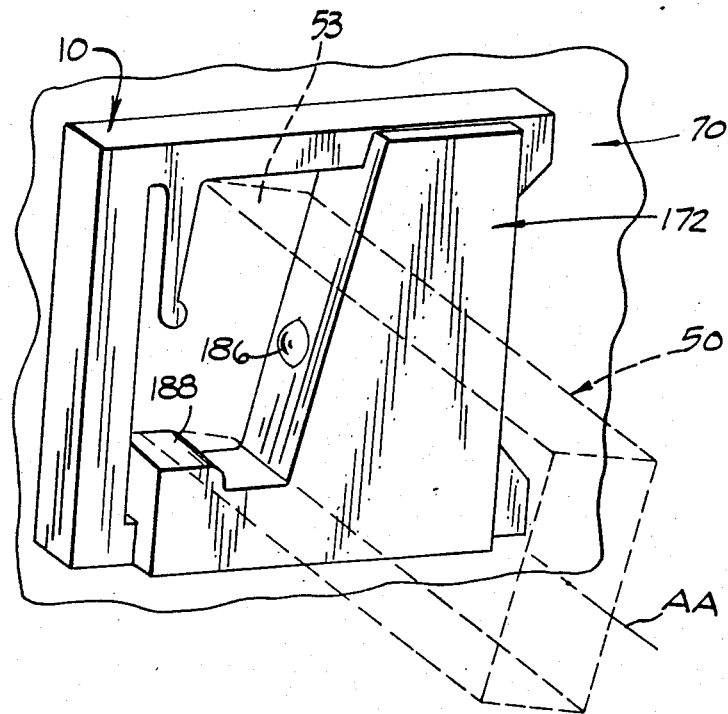
FIG. 9 is a partially broken away perspective view of a scanner mirror mounting structure and clip assembly adapted to support the end of the mirror opposite to that shown in FIGS. 5–7.

As best illustrated in FIGS. 5, 6, and 7, the clip assembly 10 is adapted to engage an end portion of an elongate mirror 50 having a central longitudinal axis AA and having a generally rectangular cross-section defined by a reflective, planar forward surface 52, a planar rear surface 54, a planar top surface 56, and a planar bottom surface 58. In one preferred embodiment of the invention, the elongate mirror may have a height of 12.7 mm and a thickness of 6.0 mm. The support structure 72 upon which the mirror 50 is adapted to be mounted may be a mirror mounting bracket which is fixedly attached to a movable optical scanner carriage 70. The mirror mounting bracket 72 comprises an upper recess 73, FIG. 7, having a horizontal surface 74 adapted to engage upper clip arm 22 to prevent vertical movement thereof and having a vertical surface 76 adapted to limit lateral movement of arm member 22. The mirror mounting bracket 72 also comprises a lower recess 77 defined by a horizontal surface 78 and vertical surface 80 which are adapted to engage lower arm member 24 to prevent vertical and lateral movement thereof. The mirror mounting bracket 72 may comprise a planar, forwardmost, vertical surface 82, FIG. 5, which is adapted to abuttingly engage the vertically extending surfaces 32 of arm projections 30, 32 to prevent rearward 81 displacement of the clip assembly 10 with respect to the bracket 72. The bracket may comprise an upwardly and forwardly inclined surface 84 having a centrally positioned hemispherical projection 86 extending outwardly therefrom, as best illustrated in FIGS. 6 and 7. The projection 86 is adapted to provide a fulcrum which facilitates adjustment of the angular position of mirror 50, as described in further detail below. A rounded shoulder surface 88 which serves to slidingly adjustably support the bottom surface 58 of mirror 50 connects a first horizontal surface portion 90 and a second horizontal surface portion 92 of the bracket 72. In one preferred embodiment of the invention, the length of surface 84 may be approximately 17.0 mm, the radius of projection 86 may be approximately 1.6 mm, the radius of shoulder surface 88 may be approximately 0.7 mm, the length of horizontal surface 90 may be approximately 3.5 mm, and the length of horizontal surface 92 may be approximately 3.4 mm. The center of projection 86 may be approximately 3.5 mm above surface 90. Surface 92 may be positioned approximately 1.2 mm above surface 90. Surface 84 may be inclined with respect to surface 90 at approximately 76°. The length from the forwardmost surface 82 to a rearwardmost surface 96 of the bracket 72 may be approximately 18.0 mm. The width of gap 73 may be 0.2 mm greater than the width of the clip assembly 12.

As illustrated in FIGS. 5, 6 and 7, a mirror adjustment assembly 100 may be fixedly attached to the mirror mounting bracket 72 as by screws (not shown) or other conventional attachment means. The adjustment assembly 100 may comprise a block 102 having a vertical slot 104 provided in an upper forward portion thereof. A threaded hole 106 is provided in an upper middle portion of the block. A curved spring steel member 108 may be mounted on an upper portion of block 102 with a rear flange portion 110 thereof received within slot 104. A rounded forward portion 112 of the spring steel member projects forwardly from block 102. A bent central body portion 114 which is integrally attached to the rear flange portion and the rounded forward portion is positioned in spaced relationship above block 102. Central body portion 114 has a screw 116 received through a forwardly extending slot 17 provided therein. Screw 116 is threadingly received within hole 106 in block 102 and is used to adjust the relative position of rounded end portion 112. Downward movement of screw 116 causes central body portion 114 to flatten and lengthen and thus causes rearward 81 displacement of rounded end portion 112. Upward movement of screw 116 enables elastic, upward return movement of the central body portion 114 and thus forward 83 displacement of rounded surface 112.

As illustrated in FIG. 7, the bracket assembly 72 is constructed and arranged such that when mirror 50 is supported on shoulder 88, projection 86 makes contact with a lower portion of mirror forward surface 52. Surface 20 of compliant member 14 makes contact with the rear surface of the mirror near the vertical center of the mirror and thus urges the mirror to rotate in a counterclockwise direction 130 about the pivot point provided by projection 86. This torque produced by the compliant member is counteracted by a torque in direction 131 provided by the spring member rounded rear portion 112.

In a typical installation, a mirror clip assembly 10, bracket 72, and adjustable assembly 100 are provided for attaching one end 51 of a mirror 50 to an associated carriage structure 70, as shown in FIGS. 4-6. A second, identical mirror clip assembly 10 and a bracket 172 is provided for attaching an opposite end 53 of the mirror 50 to the carriage structure 70, FIG. 9. Bracket 172 is essentially a mirror image duplicate of bracket 72, except that mirror engaging projection 186 of bracket 172 is located so as to engage the mirror 50 at approximately the center thereof rather than a lower portion thereof. No adjustment assembly is provided in association with bracket 172. The end portions 51, 53 of the mirror are initially set on the two support brackets 72, 172, with the mirror contacting surface 88 and 86 of bracket 72 and corresponding surfaces 188 and 186 on bracket 172. The mirror also contacts the curved end portion 112 of the spring steel member 108. Next, a clip assembly 10 is installed on each bracket 72, 172 by initially placing each of the arm projections 28, 30 at the rear opening of an associated bracket recess, e.g. 73, 77, and then urging the clip assembly forwardly. The bracket arm projections, in response to this forward pressure, move outwardly and over the horizontal surface, e.g. 74, 78, defining each recess, and then continue moving forwardly until passing beyond the forward vertical wall surface, e.g. 82, of the associated bracket, e.g. 72. The elastic resiliency of the arm members 22, 24 thereafter causes the arm members to displace inwardly into abutting contact with the horizontal recess surfaces, e.g. 74 and 78. Thus, the clip assembly "snaps" into a stable, fixed relationship with the associated bracket, e.g. 72. The clip assemblies and brackets and mirror have dimensions such that the mirror exerts a rearward force on each clip assembly which is resisted by the abutting engagement of arm projection surfaces 32 and forward surface, e.g. 82 of each bracket, thus locking the clip assembly in place. To remove a clip assembly 10, the clip arm portion projections 28, 30 are grasped and separated, as illustrated in FIG. 4, followed by rearward displacement of the clip assembly 10.

Figure 10:
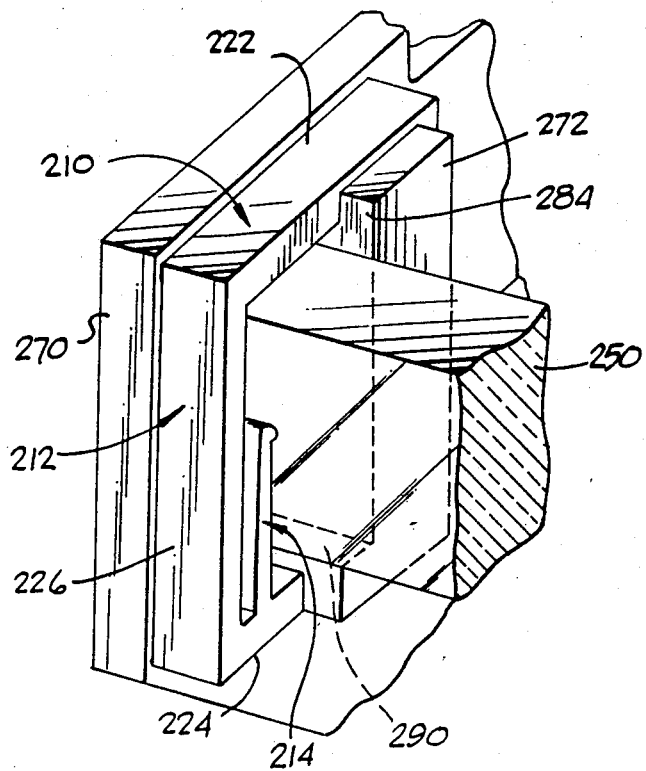
FIG. 10 is a perspective view of another embodiment of a scanner mirror, mounting structure and clip assembly.

An alternate embodiment of a clip assembly is illustrated in FIG. 10 in which a clip assembly 210 is provided having a U-shaped body 212 with an upper arm 222 and a lower arm 224 attached to a transverse member 226. A compliant member 214 is mounted on the lower arm 224 and is adapted to engage a mirror 250 to urge the mirror against a bracket assembly 272 having a vertical surface 284 and a horizontal surface 290. In this embodiment, no adjustable assembly is provided and the compliant member 214 holds the mirror in abutting, fixed relationship with the surfaces 284, 290 of the bracket assembly 272. Clip assembly 210, like clip 10, due to the deflectability of the compliant member 214, accommodates small variations in the dimensions of both the mirror 250 and the mirror mounting bracket 272.

In another embodiment of a clip assembly (not shown), a compliant member projects from a transverse member portion of a U-shaped clip body.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A scanner mirror assembly comprising:
   (a) an elongate optical scanner mirror;
   (b) a mirror support structure; and
   (c) a clip assembly for attaching said elongate optical scanner mirror to said mirror support structure comprising:
   (i) U-shaped body means for resiliently, snappingly engaging said support structure for holding said clip assembly in stationary relationship with said support structure;
   (ii) compliant member means integrally formed with said body means for urging said elongate mirror against said support structure whereby said mirror is resiliently held in stationary relationship with said support structure;
   (iii) said compliant member means comprising an elongate resilient member having a first end portion attached to said U-shaped body means and having a second end portion adapted to engage said elongate mirror;
   (iv) said U-shaped body means comprising a pair of generally parallel, forwardly extending arm members attached at proximal ends thereof to a transverse member and having inwardly extending projections on distal ends thereof, said inwardly extending projections being adapted to abuttingly engage first predetermine surface portions of said support structure to prevent rearward displacement of said clip assembly, said arm members being adapted to engage second predetermined surface portions of said support structure to prevent vertical displacement of said clip assembly and also being adapted to engage third predetermined portions of said support structure to prevent lateral displacement of said clip assembly;
   (v) said arm members being generally parallel in an unstressed state and being adapted to initially resiliently outwardly deflect and then elastically return to said generally parallel relationship during installation of said clip assembly on said support structure; and
   (v) each of said arm end projections comprising:
     a forward beveled surface adapted to produce initial outward deflection of an associated arm member during installation of said clip assembly on said support structure; and
     a rear vertical surface adapted to abuttingly engage said support structure after installation of said clip assembly on said support structure.

2. A scanner mirror assembly comprising:
   (a) an elongate optical scanner mirror;
   (b) a mirror support structure; and
   (c) a clip assembly for attaching said elongate optical scanner mirror to said mirror support structure comprising:
   (i) U-shaped body means for resiliently, snappingly engaging said support structure for holding said clip assembly in stationary relationship with said support structure;
   (ii) compliant member means integrally formed with said body means for urging said elongate mirror against said support structure whereby said mirror is resiliently held in stationary relationship with said support structure; and
   (iii) adjustable displacement means mounted on said support structure for adjustably displacing said elongate mirror relative to said support structure.

3. The invention of claim 2, said adjustable displacement means being adapted to move said mirror in a direction generally opposite to the direction in which force is exerted on said mirror by said compliant member means.

4. The invention of claim 3, said adjustable displacement means being adapted to adjustably rotate said mirror.

5. The invention of claim 4, said adjustable displacement means comprising an elastically deformable member engaged with a portion of said elongate mirror and a screw member adapted to adjustably deformably displace said elastically deformable member.

6. A scanner mirror assembly comprising:
   (a) an elongate optical scanner mirror;
   (b) a mirror support structure; and
   (c) a clip assembly for attaching said elongate optical scanner mirror to said mirror support structure comprising:
      (i) U-shaped body means for resiliently, snappingly engaging said support structure for holding said clip assembly in stationary relationship with said support structure;
      (ii) compliant member means integrally formed with said body means for urging said elongate mirror against said support structure whereby said mirror is resiliently held in stationary relationship with said support structure;
      (iii) said clip assembly being adapted to provide a first torque on said mirror whereby said mirror is biased in a first angular direction thereby; and
      (iv) angular adjustment means adapted to adjustably apply a second torque to said mirror in a direction opposite said first torque for adjusting the angular orientation of said mirror.

7. A method of attaching an optical scanner mirror to a scanner support structure comprising the steps of:
   (a) positioning the scanner mirror on the support structure;
   (b) urging a generally U-shaped body portion of a mirror clip assembly into snap-fit, locking relationship with the support structure while urging a compliant member portion of the clip assembly into engagement with the mirror.

8. The invention of claim 7 comprising removing the clip assembly by the steps of:
   (a) spreading apart parallel arm portions of the clip assembly body portion; and
   (b) withdrawing the clip assembly from contact with the mirror and support structure.

9. A scanner mirror assembly comprising:
   (a) an elongate optical scanner mirror;
   (b) a mirror support structure; and
   (c) a clip assembly for attaching said elongate optical scanner mirror to said mirror support structure comprising:
      (i) U-shaped body means for resiliently, snappingly engaging said support structure for holding said clip assembly in stationary relationship with said support structure; and
      (ii) compliant member means integrally formed with said body means for urging said elongate mirror against said support structure whereby said mirror is resiliently held in stationary relationship with said support structure.

10. The invention of claim 9, said compliant member means comprising an elongate resilient member having a first end portion attached to said U-shaped body means and having a second end projection means for engaging said elongate mirror.

11. The invention of claim 10, said U-shaped body means comprising a pair of generally parallel, forwardly extending arm means attached at proximal ends thereof to a transverse member for engaging first predetermined surface portions of said support structure to prevent vertical displacement of said clip assembly and for engaging second predetermined portions of said support structure for preventing lateral displacement of said clip assembly; said arm means having inwardly extending projection means on distal ends thereof for abuttingly engaging first predetermined surface portions of said support structure for preventing rearward displacement of said clip assembly.

12. The invention of claim 11, said arm means being generally parallel in an unstressed state and being adapted to initially resiliently outwardly deflect and then elastically return to said generally parallel relationship during installation of said clip assembly on said support structure.

* * * * *